(No Model.) 2 Sheets—Sheet 1.
E. D. CROSS.
MOTOR VEHICLE.
No. 577,572. Patented Feb. 23, 1897.
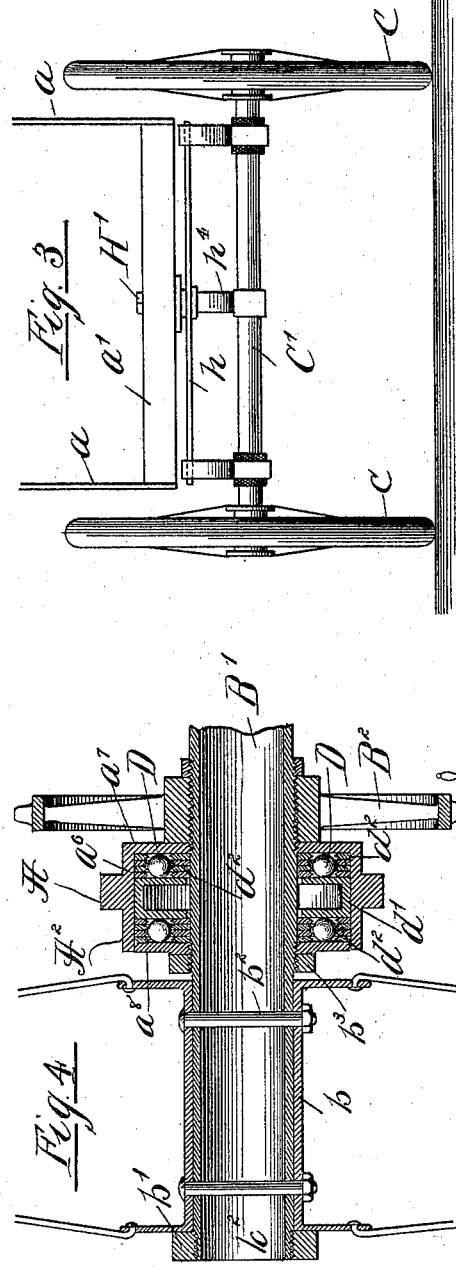
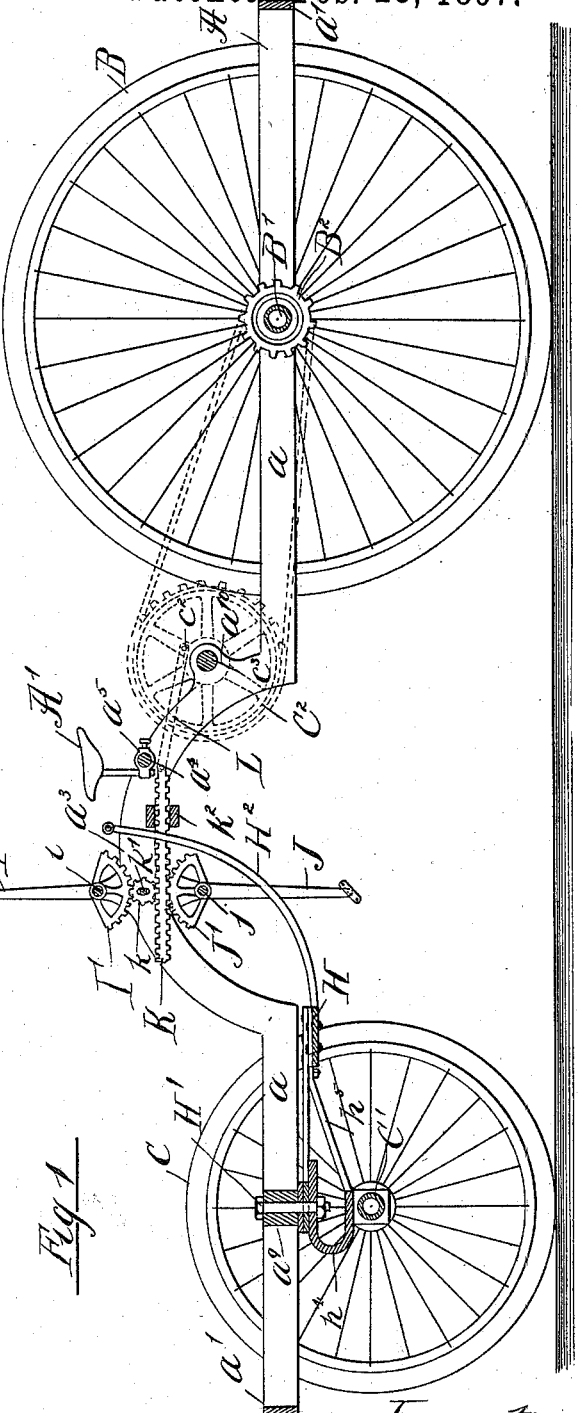
Witnesses
L. Clinton Hamlin
John W. Adams
Inventor
Eben D. Cross
by Dayton, Poole, Brown
his Attorneys

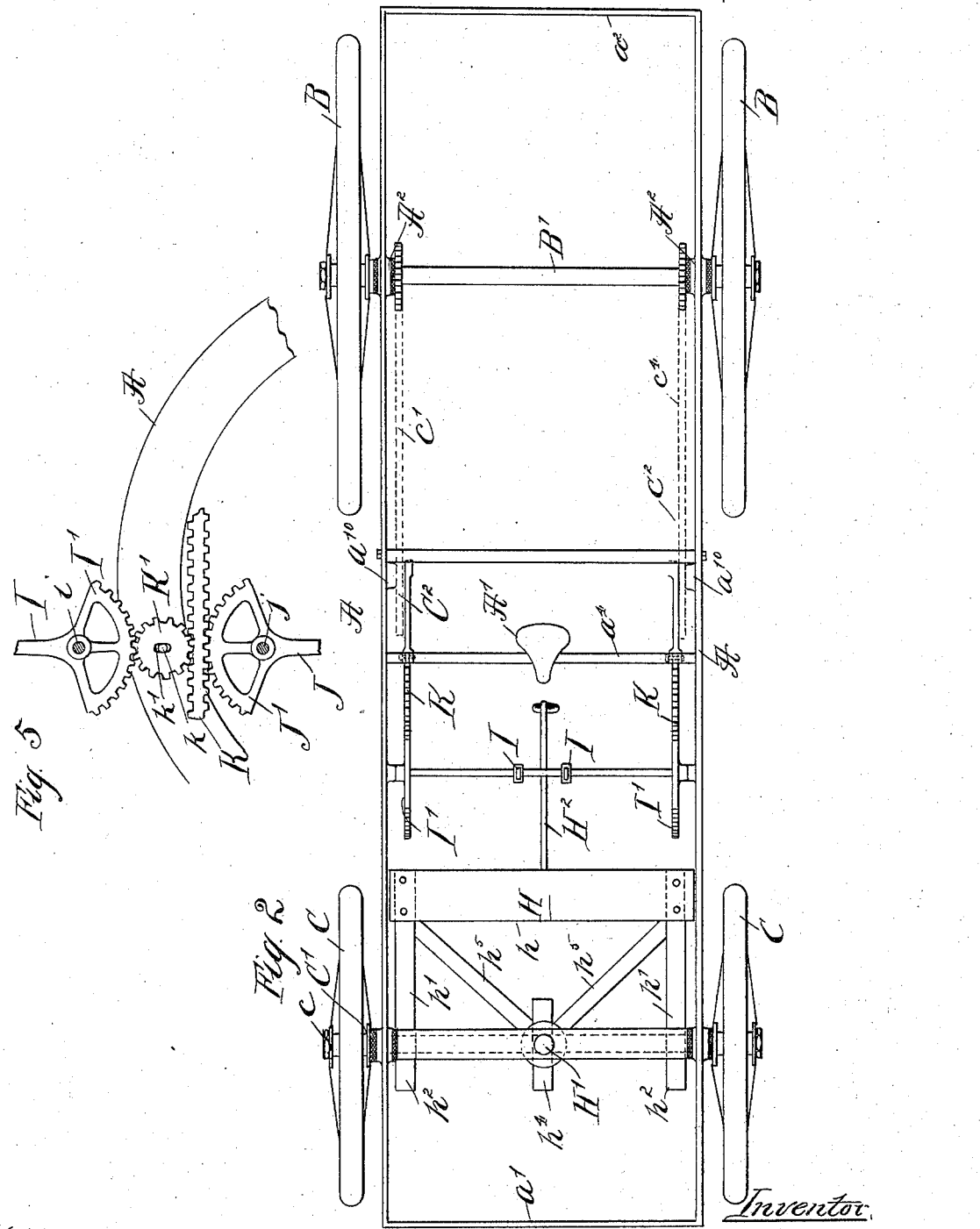

UNITED STATES PATENT OFFICE.

EBEN D. CROSS, OF CHICAGO, ILLINOIS, ASSIGNOR OF ONE-FOURTH TO WILLIAM P. TUTTLE, OF SAME PLACE.

MOTOR-VEHICLE.

SPECIFICATION forming part of Letters Patent No. 577,572, dated February 23, 1897.

Application filed July 25, 1895. Serial No. 557,071. (No model.)

*To all whom it may concern:*

Be it known that I, EBEN D. CROSS, of Chicago, in the county of Cook and State of Illinois, have invented certain new and useful Improvements in Motor-Vehicles; and I do hereby declare that the following is a full, clear, and exact description thereof, reference being had to the accompanying drawings, and to the letters of reference marked thereon, which form a part of this specification.

This invention relates to improvements in vehicles, and more particularly to that class of such vehicles which are designed to be driven by hand-power, although many features of my improvements are adapted for use on vehicles which are driven by gasolene, steam, or other forms of motor.

The invention contemplates the provision of hand and foot power devices which may be thrown into or out of operation, as desired.

The invention consists in the matters herein set forth, and particularly pointed out in the appended claims.

Figure 1 is a longitudinal sectional elevation of a vehicle constructed in accordance with my invention. Fig. 2 is a plan view thereof. Fig. 3 is a front view showing the manner of pivoting the front truck to the main frame. Fig. 4 is a sectional detail of one of the driving-wheel hubs and of one of the bearings for the driving-wheel shaft. Fig. 5 is a detail of my improved double-leverage hand and foot mechanism.

In said drawings, A designates the main frame of the vehicle, B the driving-wheels thereof, and C the front supporting and steering wheels, all of said wheels being preferably, and in this instance shown, made of the lightest and strongest possible construction, with wire spokes and pneumatic tires, in accordance with the best known practice in cycle construction. Obviously, however, any other style of wheel may be employed if for any reason found preferable in particular cases.

The main frame A, as herein shown, is of rectangular shape in plan view and comprises longitudinal side bars $a\ a$, connected at their front and rear ends by transverse bars $a'\ a^2$ and provided with intermediate transverse bars $f f' f^2$. Said side bars are provided about midway between the wheels B and C with upwardly-arched portions $a^3\ a^3$, which support a transverse seat-rod $a^4$. A seat A' for the operator is mounted on the rod $a^4$ midway between the frames in a suitable clip $a^5$, which enables the seat to be adjusted up and down or sidewise, as desired. Preferably, and as herein shown, said seat is an ordinary bicycle-saddle, but any other form of seat may be substituted therefor, if desired, without departing from the spirit of my invention.

The driving-wheels B are rigidly secured to the ends of the rear shaft or axle B', which is journaled in antifriction-bearings $A^2$ on the frame A. Said shaft, as herein shown, is made of tubing of proper diameter to fit within the hubs $b$ of the wheels, and is provided at its extremities with nuts $b'$, which are screwed on after the wheels are put in place. Bolts or rivets $b^2$ or other equivalent devices pass through the hubs and shaft and secure the same against relative rotation.

The journal-bearings $A^2$ each comprise a cylindric casing $a^6$, of considerable width, within which two sets of steel balls D are provided. The two sets of balls are separated by a hollow annular washer $d'$, which also serves as a reservoir for the oil by which the bearing is lubricated. Each set of balls D is inserted between outer annular washers $d'$, which fit closely within the cylindric casing $a^6$, and inner annular washers $d^2$, which fit over the shaft B'. The inner edges of the outer washers and the outer edges of the inner washers are sharpened or made of V shape in cross-section and form in effect a plurality of annular knife-edges upon which the balls D roll. The areas of contact of the bearing-surfaces are therefore very small and the friction correspondingly reduced. Both the balls and the washers are, moreover, hardened, so that the wear is almost imperceptible. On its inner side each casing $a^6$ is provided with an annular flange $a^7$, which incloses the bearing balls and washers on one side, while on the other side they are inclosed by a washer $a^8$, which has a screw-threaded engagement with the shaft B'. Check-nuts $b^3$ are screwed upon the shaft after the washers $a^8$ to keep the latter from working away from their adjusted position.

The frame of the forward or steering truck

H is pivotally connected with the main frame A of the vehicle, but rigidly mounted upon the front axle C', which latter is provided with the front wheels C. The latter are journaled on the front end of the front axle C', any suitable form of antifriction-bearing being provided on the hub $c$ of said wheels to receive the ends of the shaft. The frame of the truck H consists of a rear transverse bar $h$, provided at its ends with side bars $h'$, which project forwardly over the axle C' and are connected therewith by spring ends $h^2$. The front bar $h^3$ is supported at its ends by being secured to the side bars $h'$ directly above the axle C', and is further supported at its center by a spring $h^4$, from the lower end of which diagonal braces $h^5$ lead rearwardly and upwardly to the rear bar $h$ and side bars $h'$ at their points of intersection. A king-bolt H', which is passed downwardly through a crossbar $a^9$ of the frame A and through the front bar $h^3$ and spring $h^4$ at the center thereof, pivotally secures the truck to the vehicle-frame A, and a rearwardly and upwardly extending handle $H^2$, which terminates in convenient distance of the operator's seat A', enables the truck to be turned on its pivot as desired, in the guiding of the machine.

I I and J J designate hand and foot levers rigidly secured to transverse shafts $i$ and $j$, which extend across the frame A in front of the seat A' and are journaled in bracket-bearings $i'$ $j'$ on the side bars $a$. Near each end said shafts $i$ and $j$ are provided with rigidly-attached toothed segments I' and J', which are adapted to operatively engage an intermediate toothed rack-bar K. The hand-lever segments I', however, do not engage the bar K directly, but operate thereon through intermediate pinions K', which are mounted upon stationary pivot-pins $k$, that project inwardly from the frame-bars $a$. The interposition of the pinions K' obviously serves to effect an opposite direction of movement in the hand and foot levers, and this enables the operator to push his feet and pull his hands at the same time, an obviously advantageous movement in which the body can be braced to do its utmost possible work without great fatigue. As a further improvement also, by which a double leverage is secured and the power greatly multiplied, I have shown the segments I' and J' made of eccentric shape, and have provided slots $k'$ in the pinions K' to engage the pivots $k$, so that said pinions have a limited sliding movement on said pivots, as well as an oscillatory movement thereon. The pivots $k$ are furthermore so located as to engage the lowermost portion of said slots when the levers I are in their central or vertical position, and the pinions then obviously in themselves act as levers in transmitting the power applied through the levers I, so that a compound leverage is thus afforded, by which the effective power acting upon the rack-bar K is enormously increased. Each rack-bar K is supported at its rear in a clip $k^2$, through which it is adapted to slide, and is connected by a pitman L with a crank-pin $c^2$ on one of two sprocket-gears $C^2$. Said gears $C^2$ are mounted upon pivot-studs $c^3$, which project inwardly from the lugs on the bar $a$ and are connected by sprocket-chains with sprocket-pinions $B^2$ on the shaft B'. The pinions $B^2$ are much smaller than the gears $C^2$, and the rotary velocity of the shaft B' is therefore much greater than that of the gears $C^2$. A very moderate action of the hands and feet on the levers I and J will therefore suffice to propel the vehicle at a high rate of speed, which at the same time will be attained with a very slight expenditure of power by reason of the effectiveness of the compound-lever action hereinbefore explained. The sprocket-pinions $B^2$ are herein shown as having a screw-threaded engagement with the shaft B' at a point just inside of the bearings $A^2$.

The operation of the device has been sufficiently set forth and will not be here repeated.

The proportions of the various parts of the machine, and particularly the proportions of the several gears, may obviously be varied as desired to produce the best results. For example, the gears $f^2$ may and ordinarily will be made of much greater diameter than as shown in this instance, so that when the hand propelling devices are operated the vehicle itself will be propelled at a much greater speed with the same number of movements per minute of the hands and feet. In fact, the compound leverage which I obtain by the peculiar and novel construction of the hand and foot propelling gear hereinbefore described enables me to gear up the machine indefinitely and to propel it without undue fatigue at rates of speed that are only limited by the requirements of safety, which the character of the roadway may determine. Additional seats for passengers and provisions for carrying goods or baggage of any description may obviously be provided as desired, and the vehicle will be otherwise constructed as described in the matter of its various details and appurtenances, but all such modifications are obviously included within the spirit of my invention and in the claims hereto appended.

I claim as my invention—

1. In a vehicle, the combination with the main frame and vehicle-wheels, of a propelling device comprising a rack-bar, a toothed segment engaging one side of said rack-bar, a pinion engaging the other side of the rack-bar, a second toothed segment engaging said pinion, hand and foot levers for oscillating said segments, a crank element connected with the rack-bar, and gearing between the crank element and driving-wheels, substantially as described.

2. In a vehicle, the combination with the main frame and vehicle-wheels, of a propelling device comprising a rack-bar, a toothed segment engaging one side of said rack-bar, a pinion engaging the other side of said rack-bar and provided with a central slot and a pivot-pin engaging said slot, a second toothed segment engaging said pinion, both of the segments being of eccentric shape, hand and foot levers connected with said segments, a crank element connected with said rack-bar, and a gearing between the crank element and driving-wheels, substantially as described.

3. An axle-bearing for vehicles comprising a cylindric casing attached to the main frame, and provided on one side with an inwardly-extending flange, two sets of balls inserted within said casing between outer and inner knife-edged annular bearing-washers, a hollow annular washer separating the two sets of balls, and a flanged collar having screw-threaded connection with the axle for inclosing the bearing on the opposite side from the casing-flange, substantially as described.

In testimony that I claim the foregoing as my invention I affix my signature, in presence of two witnesses, this 22d day of July, A. D. 1895.

EBEN D. CROSS.

Witnesses:
WILLIAM L. HALL,
L. CLINTON HAMLINK.